United States Patent
Joel et al.

(10) Patent No.: US 12,116,140 B2
(45) Date of Patent: Oct. 15, 2024

(54) INLET OUTER BARREL SEGMENTED ATTACH FLANGE

(71) Applicant: The Boeing Company, Arlington, VA (US)

(72) Inventors: Jason Franklin Joel, North Charleston, SC (US); Robert Morrow, Summerville, SC (US)

(73) Assignee: The Boeing Company, Arlington, VA (US)

( * ) Notice: Subject to any disclaimer, the term of this patent is extended or adjusted under 35 U.S.C. 154(b) by 8 days.

(21) Appl. No.: 18/171,554

(22) Filed: Feb. 20, 2023

(65) Prior Publication Data

US 2024/0278924 A1   Aug. 22, 2024

(51) Int. Cl.
| | | |
|---|---|---|
| *B64D 33/02* | (2006.01) | |
| *B64D 29/06* | (2006.01) | |
| *B33Y 80/00* | (2015.01) | |

(52) U.S. Cl.
CPC ............. *B64D 33/02* (2013.01); *B64D 29/06* (2013.01); *B33Y 80/00* (2014.12)

(58) Field of Classification Search
CPC ......... B64D 33/02; B64D 29/06; B33Y 80/00
See application file for complete search history.

(56) References Cited

U.S. PATENT DOCUMENTS

| | | |
|---|---|---|
| 2015/0285144 A1 | 10/2015 | Todorovic et al. |
| 2016/0377090 A1 | 12/2016 | Brown et al. |
| 2022/0082064 A1 | 3/2022 | Boileau et al. |
| 2024/0017845 A1 | 1/2024 | Rust |
| 2024/0018883 A1 * | 1/2024 | Rust ...................... B64D 15/06 |

OTHER PUBLICATIONS

European Patent Office Extended Search Report, dated Jul. 19, 2024, regarding Application No. EP24153224.1, 8 pages.

* cited by examiner

*Primary Examiner* — Valentina Xavier
(74) *Attorney, Agent, or Firm* — Yee & Associates, P.C.

(57) ABSTRACT

An engine nacelle inlet is provided. The inlet comprises an inner barrel having a leading edge and a trailing edge. A segmented attach flange is connected to an outer circumference of the trailing edge of the inner barrel, wherein the segmented attach flange comprises a number of discrete attach flange fittings. An outer barrel having a leading edge and a trailing edge surrounds the inner barrel. A number of attachment brackets connect the outer barrel to the segmented attach flange. Each attachment bracket comprises two struts connected at a common point on the trailing edge of the outer barrel and connected at separate points on one of the attach flange fittings to form a truss. Each attachment bracket is connected to a separate respective attach flange fitting.

20 Claims, 7 Drawing Sheets

INLET OUTER BARREL SEGMENTED ATTACH FLANGE

BACKGROUND INFORMATION

1. Field

The present disclosure relates generally to jet engine nacelles, and in particular, to an attachment bracket between an engine fan case A1 flange to the inner and outer barrel of a nacelle inlet.

2. Background

The aft bulkhead of an engine nacelle inlet is typically large and comprises expensive material that make the aft bulkhead an expensive component and weight contributor to the engine nacelle. Existing nacelles comprise full bulkhead hoop continuity of material, stiffening ribs for flight loads, and energy absorption spring for Fan Blade Out (FBO) loading.

Therefore, it would be desirable to have a method and apparatus that take into account at least some of the issues discussed above, as well as other possible issues.

SUMMARY

An illustrative comprises an engine nacelle inlet comprising an inner barrel having a leading edge and a trailing edge. A segmented attach flange is connected to an outer circumference of the trailing edge of the inner barrel, wherein the segmented attach flange comprises a number of discrete attach flange fittings. An outer barrel having a leading edge and a trailing edge surrounds the inner barrel. A number of attachment brackets connect the outer barrel to the segmented attach flange. Each attachment bracket comprises two struts connected at a common point on the trailing edge of the outer barrel and connected at separate points on one of the attach flange fittings to form a truss. Each attachment bracket is connected to a separate respective attach flange fitting.

Another illustrative embodiment provides an engine nacelle inlet aft bulkhead comprising a segmented attach flange configured to connect to an outer circumference of a trailing edge of an inner barrel. The segmented attach flange comprises a number of discrete attach flange fittings. A number of attachment brackets comprise two struts configured to connect at a common point on a trailing edge of an outer barrel and connect at separate points on one of the attach flange fittings to form a truss. Each attachment bracket is connected to a separate respective attach flange fitting.

Another illustrative embodiment provides an engine nacelle inlet attachment bracket. The bracket comprises a first strut, a second strut, and an attach flange fitting of a segmented attach flange. The first strut and second strut are configured to connect at a common point on a trailing edge of an outer barrel and connect at separate points on the attach flange fitting to form a truss.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations as described herein. The illustrative embodiments recognize and take into account that the aft bulkhead of an engine nacelle inlet is typically large and comprises expensive material that make the aft bulkhead an expensive component and weight contributor to the engine nacelle. The size of the aft bulkhead is due to the diameter of the nacelle. The material for the bulkhead typically comprises large machining of aluminum or super plastically formed titanium, contributing to the expensive of the aft bulkhead.

The illustrative embodiments also recognize and take into account that existing solutions require full bulkhead hoop continuity of material, stiffening ribs for flight loads, and energy absorption spring for Fan Blade Out (FBO) loading wherein a compressor or fan blade breaks off within the engine. Such parts are typically expensive, large, and difficult to manufacture.

The illustrative embodiments provide an attachment bracket with triangularly arrange legs connected between an engine fan case A1 flange to the inner barrel and outer barrel of an engine nacelle inlet. The triangular bracket replaces a traditional continuous bulkhead with discrete shape optimized fittings, thereby reducing the amount of material weight and part size required to adequately brace the outer barrel.

Figure 1:
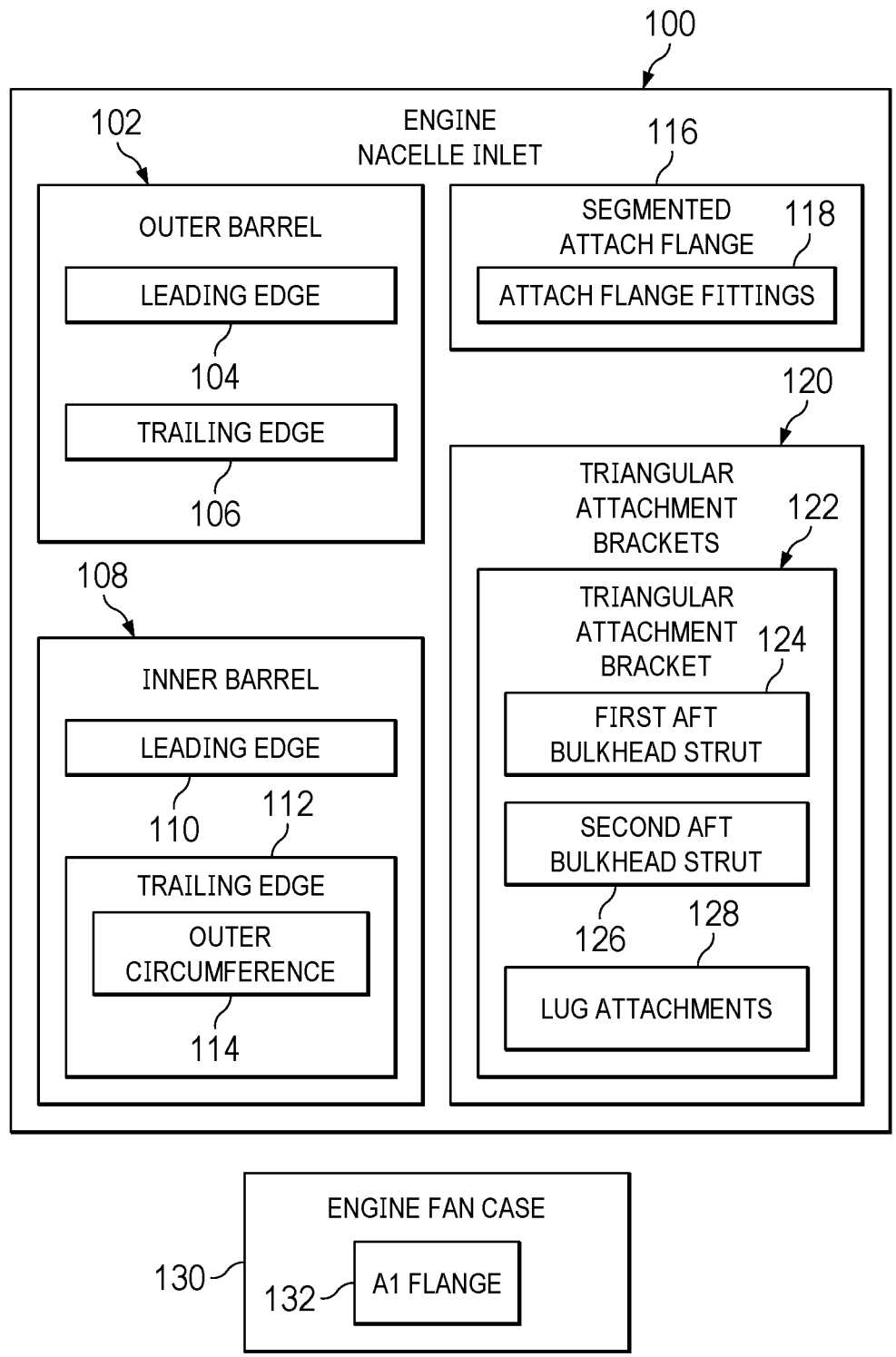
FIG. 1 depicts a block diagram of an engine nacelle inlet in accordance with an illustrative embodiment.

FIG. 1 depicts a block diagram of an engine nacelle inlet in accordance with an illustrative embodiment. Engine nacelle inlet 100 comprises an outer barrel 102 that surrounds an inner barrel 108. Outer barrel 102 comprises a leading edge 104 and trailing edge end 106. Similarly, inner barrel 108 comprises a leading edge 110 and trailing edge 112 with outer circumference 114.

Engine nacelle inlet 100 further comprises a segmented attach flange connected to the outer circumference 114 of the aft end of inner barrel 108. Segmented attach flange 116 comprises a number of discrete attach flange fittings 118. The segmented attach flange 116 connects to the A1 flange 132 of the engine fan case 130.

A number of discrete triangular attachment brackets 120 are configured to connect the outer barrel 102 to segmented attach flange 116. Each triangular attachment bracket 122 comprises a first aft bulkhead strut 124 and a second aft bulkhead strut 126. Lug attachments 128 may be used to connect the first and second aft bulkhead struts 124, 126 to a respective attach flange fitting 118.

The segmented attach flange 116 connects three components: outer barrel 102, inner barrel 108, and A1 flange 132 of the fan case 130. The segmented attach flange 116 can be integrated with the aft bullhead struts 124, 126 as a monolithic part, or a bolt up structure. The segmented attach flange 116 replaces what is traditionally called an attach ring comprising a continuous hoop.

Figure 2:
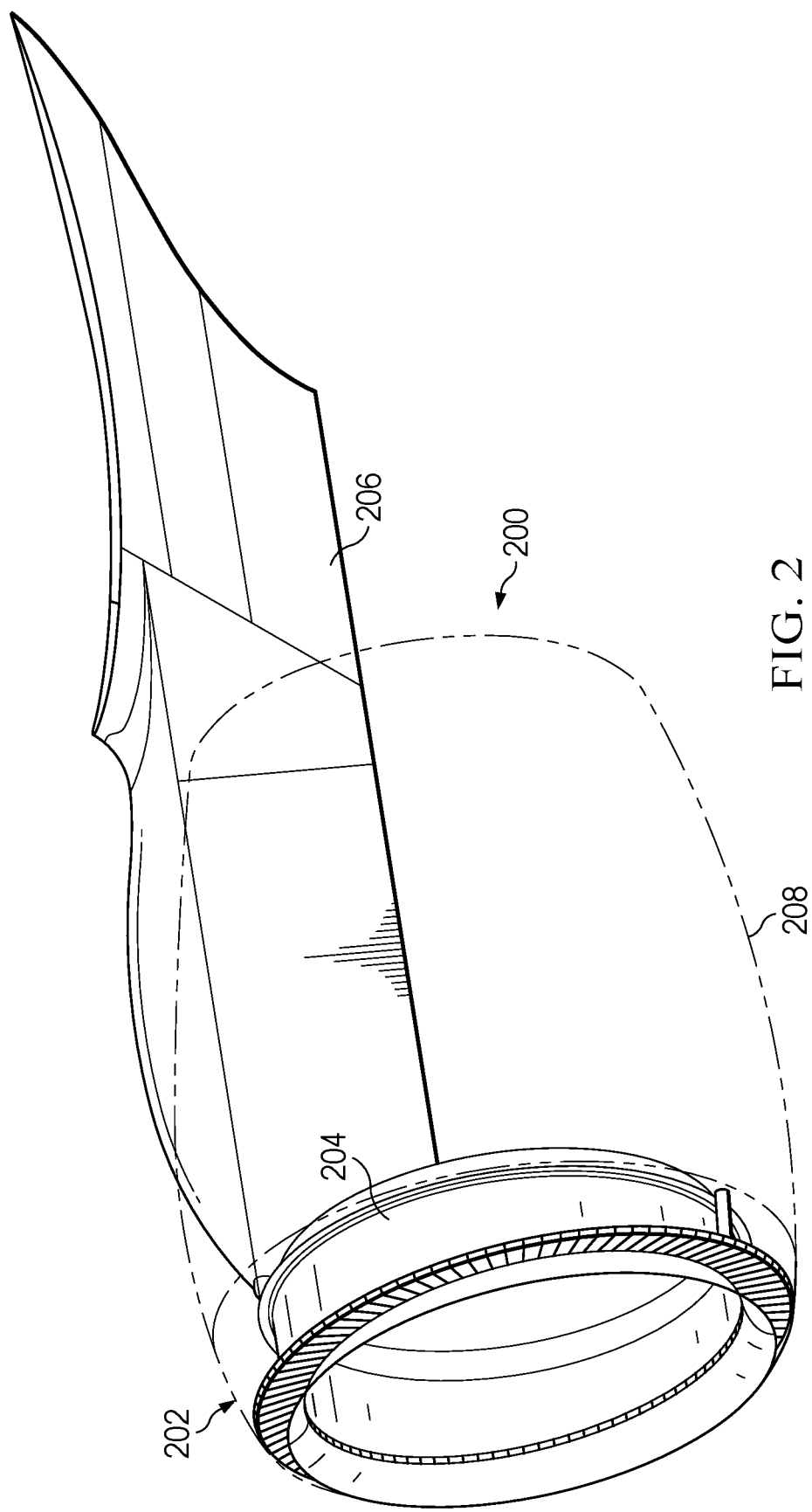
FIG. 2 depicts an illustration of a turbofan engine nacelle in which the illustrative embodiments may be implemented.

FIG. 2 depicts an illustration of a turbofan engine nacelle in which the illustrative embodiments may be implemented. Nacelle 200 is mounted on pylon 206, which may be mounted on an aircraft wing (not shown).

The front section of nacelle 200 comprises an inlet 202. An inner and outer barrel of the inlet 202 connect to the aft bulkhead 210. The aft bulkhead 210 connects to an attach ring 204 (replaced by a segmented attach flange in the illustrative embodiments), which in turn connects to the A1 flange (not shown) of the engine fan case 208.

Figure 3:
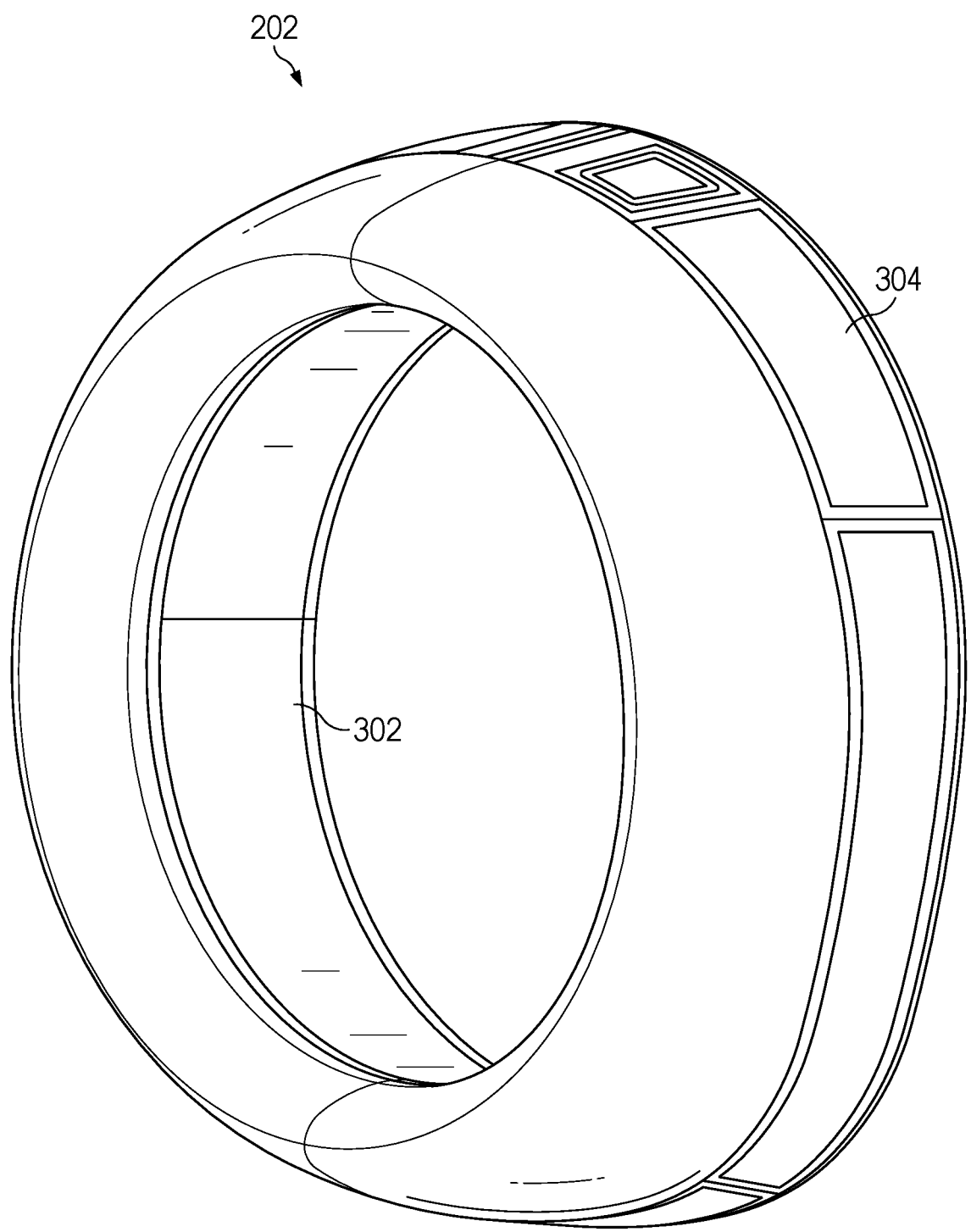
FIG. 3 depicts a front perspective view of an engine nacelle inlet in accordance with the prior art.
Figure 4:
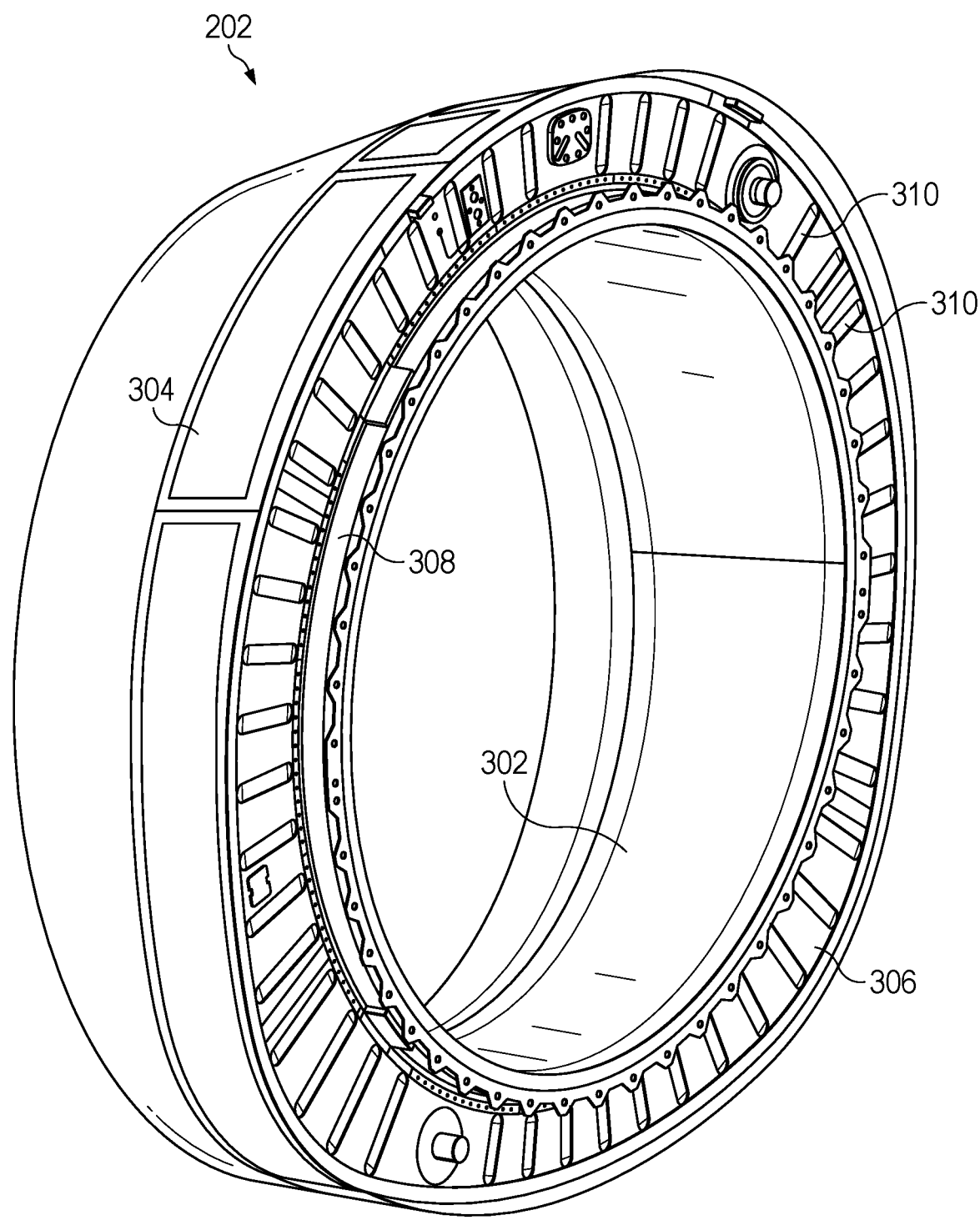
FIG. 4 depicts a rear perspective view of the engine nacelle inlet in accordance with the prior art.

FIG. 3 depicts a front perspective view of an engine nacelle inlet. FIG. 4 depicts a rear perspective view of the engine nacelle inlet. FIGS. 3 and 4 may be more detailed examples of inlet 202 in FIG. 2.

Inlet 202 comprises an inner barrel 302 and an outer barrel 304. As shown in FIG. 4, aft bulkhead web 306 connected to an energy absorption spring 308 for FBO loads. Energy absorption spring 308 is shaped in a J-hook (see FIG. 5) to act as a leaf spring. The traditional way for designing a aft bulkhead/attach flange involves a compromise of two very different objectives: (1) the need for strength and stiffness for normal flight mission loads, and (2) the ability to allow the inner barrel to absorb an energy wave during FBO, otherwise the entire inlet would fall off the engine if the inner barrel facesheets tear (aka unzip, delaminate, disbond).

Figure 5:
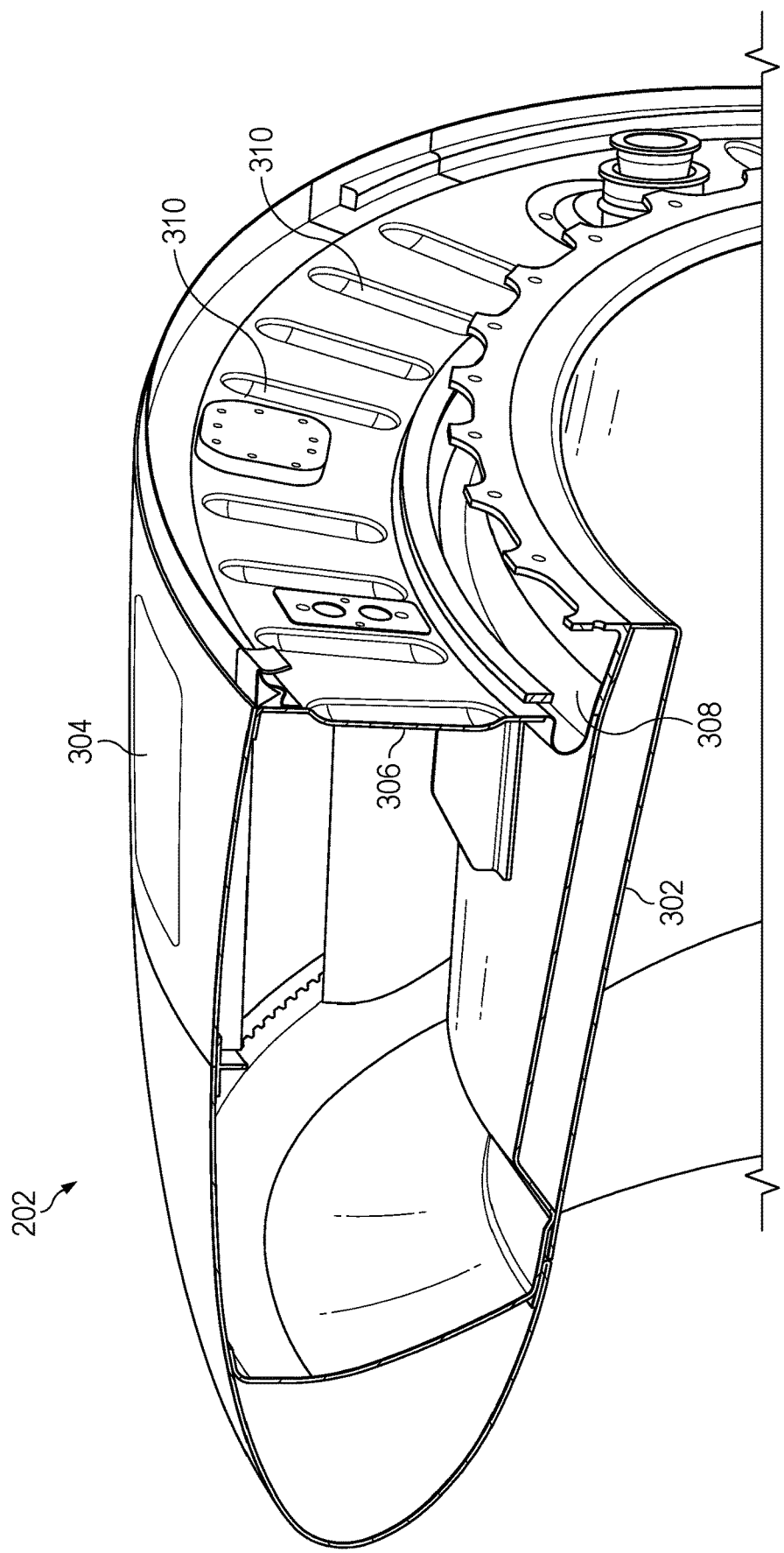
FIG. 5 depicts a cross-section perspective view of an engine nacelle inlet in accordance with the prior art.

Also shown in FIG. 4, are stiffening ribs 310 around the circumference of aft bulkhead web 306 (see also FIG. 5).

FIG. 5 depicts a cross-section perspective view of engine nacelle inlet 202. The view illustrated in FIG. 5 provides a clear view of how the aft bulkhead web 306 connects the out barrel 304 and the energy absorption spring 308. Stiffening ribs 310 provide both strength to withstand structural loads during flight and reduce the bulkhead's ability to absorb load from FBO events. However, the continuous material hoop of the aft bulkhead web 306 and stiffening ribs 310 contributes considerable weight and manufacturing costs for the engine nacelle. The stiffness and inherent stability of stiffened continuous bulkheads necessitates the addition of an energy absorption spring 308 to absorb high FBO energy displacement waves. However, this energy absorption spring 308 is counterproductive to the stiffening and strength features of the aft bulkhead during all flight segments other than an FBO and subsequent imbalanced rotation Windmilling load case.

The illustrative embodiments employ the use of intentional buckling of the aft bulkhead struts/segmented attach flange to allow the inner barrel to follow the energy wave of the A1 flange under FBO, but still be strong enough to maintain stiffness for aircraft flight loads. The illustrative embodiments eliminate the continuous aft bulkhead web 306 and energy absorption spring 308, thereby eliminating the inefficient design tradeoff of having a large amount of material for flight loads while trying to make that material soft for FBO loads.

Figure 6:
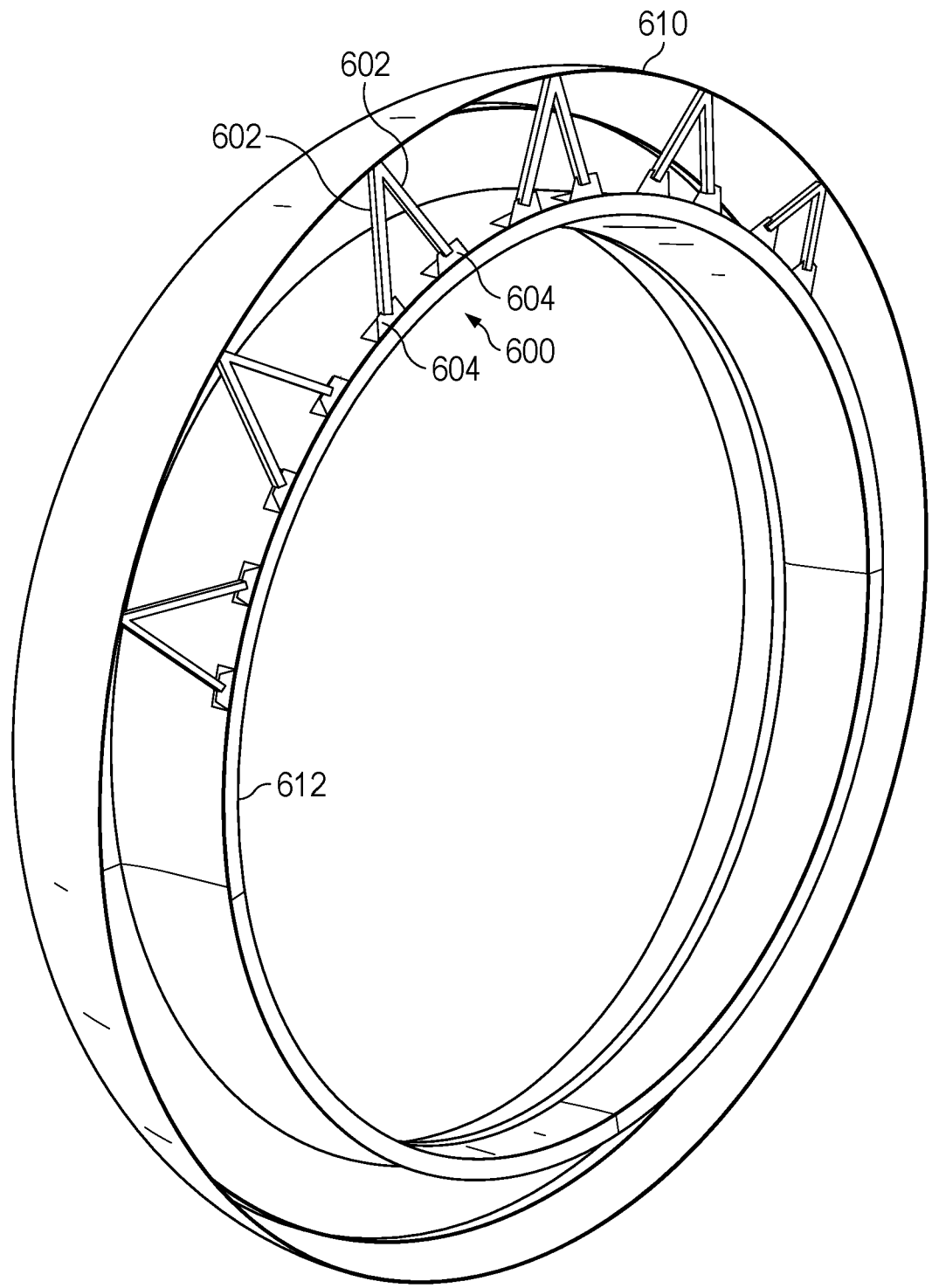
FIG. 6 depicts a rear perspective view of an engine nacelle inlet with triangular attachment brackets and segmented attach flange in accordance with an illustrative embodiment.

FIG. 6 depicts a rear perspective view of an engine nacelle inlet with triangular attachment brackets and segmented attach flange in accordance with an illustrative embodiment. Triangular attachment brackets 600 are example implementations of triangular attachment brackets 120 in FIG. 1.

Each discrete triangular attachment bracket 600 comprises two aft bulkhead struts 602 that connect the outer barrel 610 to respective attach flange fittings 604. Aft bulkheads struts 602 may be made of aluminum (e.g., 7050 machined aluminum), titanium (e.g., Titanium 6242), or 3D printed composite/metallic material.

As shown, each pair of aft bulkhead struts 602 attach at a common point on the trailing edge of the outer barrel 610 and attach at separate points on an attach flange fitting 604, thereby forming a truss. Each pair of aft bulkhead struts 602 is connected to a separate respective attach flange fitting 604.

The trusses formed by the aft bulkhead struts 602 and attach flange fittings 604 collectively form an aft bulkhead and replace the continuous aft bulkhead web 306 shown in FIGS. 4 and 5.

The segmented attach flange comprises a number of attach flange fittings 604 connected to the inner barrel 612 around the outer circumference of the aft end of the inner barrel. Attach flange fittings 604 may be made of aluminum, 3D printed aluminum, or compression molded composite. Aft bulkhead struts 602 are configured to connect to flange fittings 604, thereby connecting the outer barrel 610 to the inner barrel 612.

It should be noted that traditional attach rings are expensive because they comprise a single machining and have extremely tight tolerances because they have to fit the inner barrel perfectly, which also makes the inner barrel expensive. The tight tolerances also makes bolting the attach ring to the inner barrel a difficult process requiring extensive use of shimming.

In contrast, the discrete fittings of the segmented attach flange of the illustrative embodiments significantly reduce costs and increase ease of assembly of the nacelle inlet compared to a single machined attach ring. For example, a traditional attach ring may comprise a single machined titanium piece the diameter of the fan case, whereas discrete fittings for a segmented attach flange for the same size engine nacelle may be one tenth the cost of the single ring, in addition to having lighter total weight and being easier to assemble.

Each flange attach fitting 604 accommodates two aft bulkhead struts 602. The aft bulkhead struts 602 of the truss may connect to the attach flange fittings 604 via lug attachments and bolts or may be integrated into the attach flange fittings. The outer barrel triangular bracket of the illustrative embodiment can provide significant weight savings. For example, for a 103-inch nacelle for a modern turbofan engine, the weight savings may be approximately 60 lbs. The outer barrel triangular bracket is also relatively inexpensive to manufacture given its compact size.

Having an open truss provided by the aft bulkhead struts 602 allows easier access of mechanics to get to the lip skin 312 (see FIGS. 3-5) of the nacelle for repairs without disassembling the entire inlet. The open truss configuration also allows for access to the EAI duct (engine anti ice) system.

Figure 7:
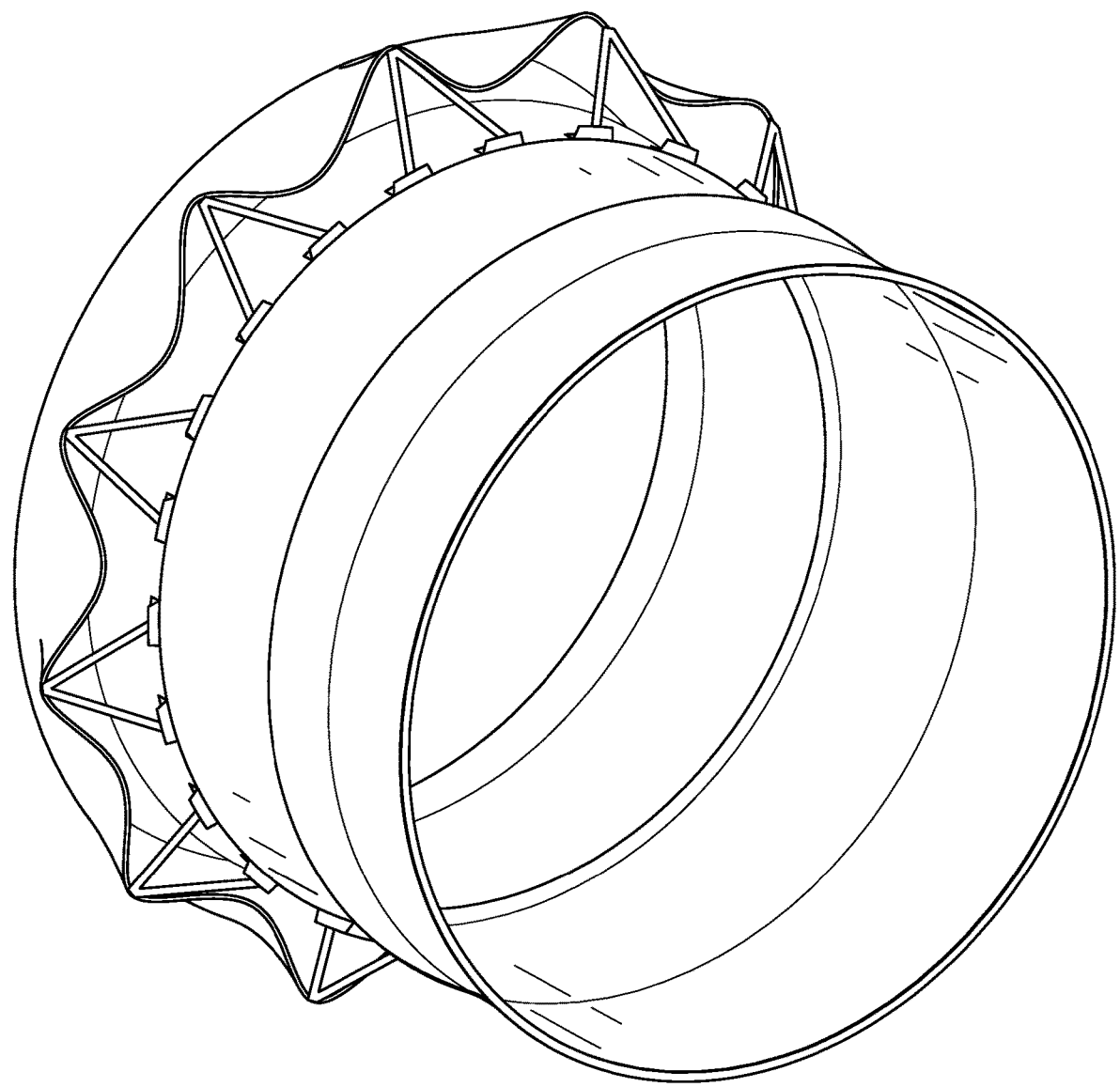
FIG. 7 depicts an illustration of an engine nacelle inlet absorbing impact loading in accordance with an illustrative embodiment.

FIG. 7 depicts an illustration of an engine nacelle inlet absorbing impact loading in accordance with an illustrative embodiment. By utilizing the discrete brackets having truss structures the outer barrel attachment is stiff enough to handle aircraft flight loads (i.e., Ground, Takeoff, Climb, Cruise, Gust, Static Maneuver, Dynamic, Decent, Landing, Reverse Thrust) but are configured to buckle under FBO energy impact loading. FBO energy impact loading may be 100-200G (G=weight of inlet) in terms of energy, which approximately 10-20× the amount of loads the inlet would experience on the worst case maneuver. Energy waves travel around the rim of the A1 flange, as shown in FIG. 7, in response to such buckling because the triangular brackets are not connected to each other.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

When one component is "connected" to another component, the connection is a physical connection. For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An engine nacelle inlet, comprising:
   an inner barrel having a leading edge and a trailing edge;
   a segmented attach flange connected to an outer circumference of the trailing edge of the inner barrel, wherein the segmented attach flange comprises a number of discrete attach flange fittings;
   an outer barrel having a leading edge and a trailing edge, wherein the outer barrel surrounds the inner barrel; and
   a number of attachment brackets connecting the outer barrel to the segmented attach flange, wherein each attachment bracket comprises two struts connected at a common point on the trailing edge of the outer barrel and connected at separate points on one of the attach flange fittings to form a truss, wherein each attachment bracket is connected to a separate respective attach flange fitting.

2. The engine nacelle inlet of claim 1, wherein the attachment brackets collectively form an aft bulkhead of the engine nacelle inlet.

3. The engine nacelle inlet of claim 1, wherein the attachment brackets are configured to buckle under FBO energy impact loading.

4. The engine nacelle inlet of claim 3, wherein the attachment brackets are configured to produce a wave around the segmented attach flange in response to buckling under FBO energy impact loading.

5. The engine nacelle inlet of claim 1, wherein attachment brackets are configured to maintain stiffness under aircraft flight loads.

6. The engine nacelle inlet of claim 1, wherein the struts are connected to the attach flange fittings via lug attachments.

7. The engine nacelle inlet of claim 1, wherein the struts are integrated with the attach flange fittings.

8. The engine nacelle inlet of claim 1, wherein the attach flange fittings are made of:
   aluminum;
   3D printed aluminum; or
   compression molded composite.

9. The engine nacelle inlet of claim 1, wherein the struts are made of:
   machined aluminum;
   titanium; or
   3D printed composite material.

10. An engine nacelle inlet aft bulkhead, comprising:
    a segmented attach flange configured to connect to an outer circumference of a trailing edge of an inner barrel, wherein the segmented attach flange comprises a number of discrete attach flange fittings; and
    a number of attachment brackets, wherein each attachment bracket comprises two struts configured to connect at a common point on a trailing edge of an outer barrel and connect at separate points on one of the attach flange fittings to form a truss, wherein each attachment bracket is connected to a separate respective attach flange fitting.

11. The engine nacelle inlet aft bulkhead of claim 10, wherein the attachment brackets are configured to buckle under FBO energy impact loading.

12. The engine nacelle inlet aft bulkhead of claim 10, wherein the attachment brackets are configured to produce a wave around the segmented attach flange in response to buckling under FBO energy impact loading.

13. The engine nacelle inlet aft bulkhead of claim 10, wherein attachment brackets are configured to maintain stiffness under aircraft flight loads.

14. The engine nacelle inlet after bulkhead of claim 10, wherein the attach flange fittings are made of:
   aluminum;
   3D printed aluminum; or
   compression molded composite.

15. The engine nacelle inlet after bulkhead of claim 10, wherein the struts are made of:
   machined aluminum;
   titanium; or
   3D printed composite material.

16. An engine nacelle inlet attachment bracket, comprising:
   a first strut;
   a second strut; and
   an attach flange fitting of a segmented attach flange, wherein the first strut and the second strut are configured to connect at a common point on a trailing edge of an outer barrel and connect at separate points on the attach flange fitting to form a truss.

17. The engine nacelle inlet attachment bracket of claim 16, wherein the attachment bracket forms part of an aft bulkhead of an engine nacelle inlet.

18. The engine nacelle inlet attachment bracket of claim 16, wherein the attachment bracket is configured to buckle under FBO energy impact loading.

19. The engine nacelle inlet attachment bracket of claim 16, wherein the attachment bracket is configured to maintain stiffness under aircraft flight loads.

20. The engine nacelle inlet attachment bracket of claim 16, wherein the struts are made of:
   machined aluminum;
   titanium; or
   3D printed composite material.

* * * * *